US008903739B1

(12) United States Patent
Janiczek

(10) Patent No.: US 8,903,739 B1
(45) Date of Patent: Dec. 2, 2014

(54) SYSTEMS AND METHODS FOR OPTIMIZING WEALTH

(75) Inventor: Joseph J. Janiczek, Lone Tree, CO (US)

(73) Assignee: Wealth With Ease, LLC, Greenwood Village, CO (US)

( * ) Notice: Subject to any disclaimer, the term of this patent is extended or adjusted under 35 U.S.C. 154(b) by 152 days.

(21) Appl. No.: 13/092,688

(22) Filed: Apr. 22, 2011

Related U.S. Application Data

(60) Provisional application No. 61/327,610, filed on Apr. 23, 2010.

(51) Int. Cl.
*G06Q 40/00* (2012.01)
(52) U.S. Cl.
USPC .......... 705/35; 705/7.12; 705/7.25; 705/36 R; 705/325
(58) Field of Classification Search
USPC .......... 705/35, 7.12, 7.25, 36 R, 325
See application file for complete search history.

(56) References Cited

U.S. PATENT DOCUMENTS

| 6,951,008 | B2 * | 9/2005 | Quaile | 706/54 |
| 8,635,087 | B1 * | 1/2014 | Igoe et al. | 705/2 |
| 2002/0013720 | A1 * | 1/2002 | Ozono et al. | 705/7 |
| 2005/0049962 | A1 * | 3/2005 | Porter et al. | 705/38 |
| 2006/0074789 | A1 * | 4/2006 | Capotosto et al. | 705/35 |
| 2008/0215501 | A1 * | 9/2008 | Rojeck et al. | 705/36 R |
| 2009/0089190 | A1 * | 4/2009 | Girulat, Jr. | 705/30 |
| 2013/0006824 | A1 * | 1/2013 | Maisonneuve | 705/35 |

OTHER PUBLICATIONS

Ponce-de-Leon-Torres et. al. Strategic group formation and evolution in an emergent industry: An exploratory analysis of the personal computer industry. Indiana University, 1989.*
Diane-Laure Arjalies-de La Lande de Valliere. Institutional Change in the Making the Case of Socially Responsible Investment. Philosophiae Doctor in Business Administration from ESSEC Business School. Jun. 28, 2010.*

* cited by examiner

*Primary Examiner* — Muriel Tinkler
(74) *Attorney, Agent, or Firm* — Carr & Ferrell LLP

(57) ABSTRACT

Systems and methods for optimizing wealth are provided herein. Exemplary methods for analyzing financial well being of a client may include generating a financial profile for an client via a web server, selecting one or more grids for displaying at least a portion of the financial profile, the grid including one or more sectors, each of the sectors corresponding to one of the plurality of strengths, filling a sector with an indicator, filling a sector with an indicator, the indicator including a calculation of a strength level for the strength associated with the sector; and providing at least one of the one or more grids to a display device associated with a computing system that is communicatively coupled to the web server.

27 Claims, 13 Drawing Sheets

Fundamentals, 3 Strengths [Balance Sheet, Cash Flow and Portfolio]

Lifestyle Protection, 9 Strengths [Liquidity, Insurance, Estate Plan, Cash Flow Resiliency, Semi-Liquid, Investment Resiliency, Investment Resiliency, Portfolio Accumulation, Passive Income, Portfolio Distribution]

Liquidity : Do you have access to an ample amount of liquid bank, money market, and pre-approved credit line resources to meet expense obligations if your income is disrupted for several weeks or months?
Insurance: Do you have catastrophic risks mitigated by appropriate amounts and types of insurance coverages?
Estate Plan: Do you have proper estate and supplemental documents (powers of attorney, etc.) to mitigate complications in the event of disability or untimely death?
Cash Flow Resiliency: Have you adequately limited expense obligations so that you can substantially reduce expenses in the event of a short- or long-term economic challenge?
Semi-Liquid : Have you built up adequate non-retirement investment accounts that are accessible and consist of enough conservative holdings that could be tapped for several years in the event of an extended financial crisis?
Investment Resiliency: Is your investment portfolio allocated in a prudent manner to provide adequate downside market protection considering your circumstances?
Portfolio Accumulation: Have you accumulated enough portfolio resources to be able to support your standard of living comfortably, even in less than desirable investment conditions?
Passive Income: Do you have enough passive income sources to meet a substantial portion of your non-discretionary expense needs, therefore reducing the withdrawal/distribution pressures from your investment portfolio?
Portfolio Distribution: If living off or tapping your portfolio, is the distribution rate a sustainable level that easily passes stress tests of past worst-case portfolio scenarios?

Asset Optimization, 4 Strengths [Portfolio Optimization, Talent Optimization, Person Property, Optimization, Non-liquid Asset Optimization]

Portfolio Optimization: Do your investment portfolio assets meet all seven of the standards of our Portfolio Enhancement Grid?
Talent Optimization: Are you optimizing your talent and putting it to its best use in the marketplace or society? Are you maximizing your career and earned income? Have you surrounded yourself, in career and personal life, with the right people, doing the right things, and doing the right things right?
Personal Property Optimization: Is your personal property an asset or a liability? Are these assets being maintained or developed to maximize their value? Relative to your net worth, are your personal assets in line with your means and cash flow?
Non-liquid Asset Optimization: Do you have productive business or real estate holdings working for you to diversify your income sources? Are these non-liquid assets being managed and developed to maximize their value?

FIG. 11A

Portfolio Enhancement, 7 Strengths [Advisor, Custodian, Efficiency, Diversification, Management, Monitoring]

Advisor: Have you designated a lead advisor who embodies the Four Fs: Fiduciary (in all capacities), Fee-Only, Full Disclosure, and Full-Breadth (financial, retirement, investment, and estate planning)?

Custodian: Are all of your investment assets organized at a single custodian that exhibits strengths in asset safety, fee schedule efficiency, and trade execution expediency, and is not associated with commissioned salespeople?

Efficiency: Are you avoiding front-end and back-end load products, able to trade at discounted institutional rates, and utilizing mutual funds, separate account managers, hedge managers, and/ or ETFs with below average management fees?

Diversification: Have you prudently established an equity/fixed income mix target based upon your circumstances, objectives, and risk temperament, and is the portfolio within this target? Does your portfolio demonstrate reasonable diversification by equity style box, fixed-income style box, sector, investment manager, security, geographic location, and active vs. indexing?

Management: Have you or your lead advisor vetted mutual fund, separate account, and hedge managers via due diligence aimed at identifying and utilizing managers with sustainable edges/ advantages? Is your portfolio regularly adjusted to respond to pre-vailing opportunities, dangers, and economic conditions?

Monitoring: Do you or your lead advisor have a state-of-the-art information management system that provides timely access to asset allocation, diversification, performance, peer group ranking, and tax data? Is this portfolio data available daily at a moment's notice?

Customization: Have you or your lead advisor stress-tested your finances under various stock/ bond mixes and distribution levels to zero in on a prudent portfolio tailored to you, and utilized this as a basis for all investment decisions?

FIG. 11B

Estate Optimization, 10 Strengths [Will/Trust, Supplemental, Title, Continuation, Protection, Simple, Complex, Family, Charity, Blueprint]

Will / Trust: Do you have base will/trust documents professionally prepared or reviewed since a major life or tax law change, or five years, whichever occurred most recently?

Supplemental: Do you have medical directives (medical power of attorney), declarations to medical/surgical treatment (living will), financial power of attorney, and a final instruction document prepared or reviewed since a major life or law change, or five years, whichever occurred most recently?

Title: Are your assets and life insurance appropriately titled? Are life insurance and retirement account beneficiary designations aligned with your estate plan?

Continuation: Have you evaluated spouse/family financial needs in the event of death or disability? Do you have adequate assets (or insurance funding) and continuation documents (including business continuation plans) in place to meet spouse/family needs?

Protection: To the extent practical and appropriate, do you have ample protections to guard against claims against your assets?

Simple: To the extent practical and appropriate, are you using relatively simple ILITs and/ or multi-generational trusts to take life insurance proceeds out of estate, eliminating multi-generational estate taxation, and enjoying some asset protection benefits?

Complex: Do you know your estate tax exposure and available tax-saving techniques, and are you implementing these where practical and appropriate?

Family: Have you engaged your family in a wealth mastery process, thus preparing them to be excellent stewards and preventing wealth from being a distraction in their lives?

Charity: Do you have an effective charitable plan that meets your objectives and maximizes the benefit society gains from such charitable gifts?

Blueprint: Do you have a document that summarizes your financial situation and estate plan and a breadcrumb letter that gives survivors easy access to documents, assets, information, and advisors in the event of death or disability?

Back Test/Stress Test, 2 Strengths [Back-test, Stress-test]

Comprehensive stress-test is another critically important way we help you make important financial decisions. Our Lifestyle Protection Analysis back-tests your earning, spending, saving, and investment plans to every 40-year period since 1900.

We simulate two scenarios to guide you on important lifestyle, career, balance sheet, and cash flow decisions. Your aim is to create and pursue a plan that passes this comprehensive stress-test.

FIG. 11C

SYSTEMS AND METHODS FOR OPTIMIZING WEALTH

CROSS-REFERENCE TO RELATED APPLICATIONS

This non-provisional patent application claims the benefit of U.S. Provisional Application Ser. No. 61/327,610 filed on Apr. 23, 2010, entitled "SYSTEMS AND METHODS FOR OPTIMIZING WEALTH"—which is hereby incorporated by reference herein in its entirety including all references cited therein.

BACKGROUND

Understanding the impact of a particular activity on the financial profile of a client or company is often an arduous task. It will be understood that a financial profile of a client is often created by a financial advisor from a multi-faceted analysis of the financial information of the client. Exemplary financial information that may be incorporated into the creation of a financial profile may include net worth, assets, liabilities, investments, retirement needs, and so forth. Financial information must be balanced against the financial goals of the client as well as other ancillary factors. Ancillary factors may include, but are not limited to, age, potential earning capacity, and lifestyle habits—just to name a few.

While creating a financial profile for a client is difficult, balancing the possible changes to such a multi-faceted financial profile by even a single financial activity may be an even greater task. Therefore, financial advisors may spend countless hours evaluating the financial impact of even the smallest proposed financial activity. Failure to either adequately generate an accurate financial profile of the client or properly gauge the financial impact of a proposed financial activity on the financial profile of the client may lead to undesirable financial consequences. Oftentimes, the negligence or subjective biases of the financial advisor may lead to the provision of erroneous financial advice to clients.

SUMMARY OF THE INVENTION

Systems and methods for optimizing wealth are provided herein. According to some embodiments, methods for analyzing financial well being of a client may include: (a) generating a financial profile for a client via a web server by: (i) receiving responses to a plurality of financial prompts to establish financial information of the client; and (ii) comparing the financial information of the client to a plurality of strengths to generate the financial profile based upon the plurality of strengths, each of the plurality of strengths including one or more rules; (b) selecting one or more grids for displaying at least a portion of the financial profile, the grid including at least one sector, the at least one sector corresponding to one of the plurality of strengths; (c) providing the at least one sector with an indicator, the indicator including a calculation of a strength level for the strength associated with the at least one sector; and (d) providing at least one of the one or more grids to a display device associated with a computing system that is communicatively coupled to the web server.

In other embodiments, methods for evaluating a financial impact of a proposed financial activity may include: (a) generating an initial financial profile for an client by: (i) receiving responses to a plurality of financial prompts to establish financial information of the client; and (ii) comparing the financial information of the client to a plurality of strengths to generate the initial financial profile based upon the plurality of strengths, each of the plurality of strengths including one or more rules; (b) receiving a financial query via a web server, the financial query including one or more financial attributes of a proposed financial activity; (c) incorporating at least one of the one or more financial attributes of the proposed financial activity into the initial financial profile to create an updated financial profile; (d) comparing the updated financial profile to the plurality of strengths to determine if incorporating at least one of the one or more financial attributes of the proposed financial activity negatively impacts a financial well being of the client; and (e) providing an alert to a computing system that is communicatively coupled to the web server if incorporating at least one of the one or more financial attributes of the proposed financial activity violates at least one of the plurality of rules.

According to additional embodiments, systems for evaluating a financial impact of a proposed financial activity on a financial well being of a client may include: (a) a memory storing executable instructions for evaluating the financial impact of a proposed financial activity; (b) a processor for executing the instructions, the instructions including: (i) a profile generator configured to generate an initial financial profile for an client by: (1) receiving responses to a plurality of financial prompts to establish financial information of the client; and (2) comparing the financial information of the client to a plurality of strengths to generate the initial financial profile based upon the plurality of strengths, each of the plurality of strengths including one or more rules; (ii) a query module that is configured to receive a financial query, the financial query including one or more financial attributes of a proposed financial activity; and (iii) a data analysis module that is configured to: (1) incorporate at least one of the one or more financial attributes of the proposed financial activity into the initial financial profile to create an updated financial profile; (2) compare the updated financial profile to the plurality of strengths to determine if incorporating at least one of the one or more financial attributes of the proposed financial activity negatively impacts a financial well being of the client; and (3) provide an alert to a computing system if incorporating at least one of the one or more financial attributes of the proposed financial activity negatively impacts the financial well being of the client.

BRIEF DESCRIPTION OF THE DRAWINGS

FIGS. 3-8 are exemplary screenshots Tool Center rendered by a display of an exemplary computing device.

FIGS. 11A-C are exemplary illustrations showing the utilization of 35 essential strengths.

DETAILED DESCRIPTION OF THE INVENTION

Figure 1:
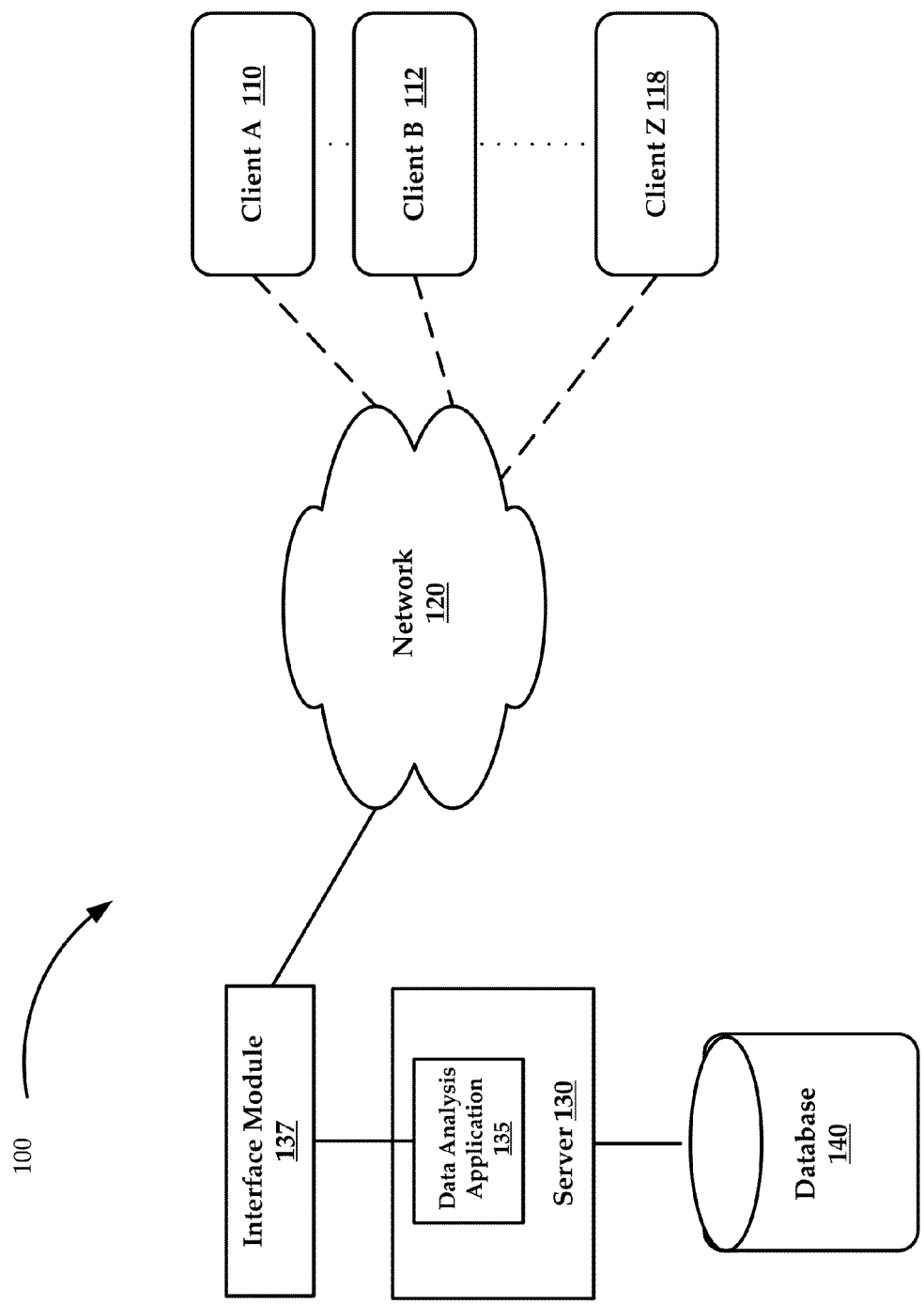
FIG. 1 is a block diagram of an exemplary computer architecture in accordance with various embodiments of the present technology.

Generally speaking, the present technology allows for systems and methods of analyzing and displaying data, particularly financial information. In some embodiments, the systems and methods utilize a Tool Center or ("TC") having grid components. According to various embodiments of the present technology, the core of the TC is based on a single source publishing design. A single source may be a database that holds client specific content that is translated on demand into multiple output formats. Client specific content may be generated into a PDF document that is ready for printing into a saddle stitched booklet or to a presentation in Power Point format. Other output from this single source of data may be created, such as HTML code to place into an intranet or an HTML version of client presentations.

The systems and methods of the present technology may, in some embodiments, be directed to objectively analyzing the financial impact of financial decisions on a financial profile of a client by first generating an initial financial profile of client or other entity. The systems and methods may compare responses received to a plurality of financial questions posed to the client to a plurality of rules. It is noteworthy that the plurality of rules for each client may be based upon the unique needs of the client.

It will be understood that the term "client" may include an individual or entity for which a financial profile is being created and/or an individual or entity inputting financial queries in to the system. In some embodiments the term "client" may refer to the individual utilizing other portions of the system described herein, such as the Tool Center. Additionally, the term "user" may be understood to be synonymous with "client," although in some instances the term "user" may be understood to include an individual that utilizes the Tool Center.

The financial impact of a proposed financial activity on the initial financial profile of client may be determined from a financial query received from the client. The systems and methods may analyze each query to determine financial attributes associated with the query and to incorporate those changes into the initial financial profile to create a proposed financial profile. By comparing the proposed financial profile to the plurality of rules, a financial impact of a particular financial decision may be determined. If the proposed financial impact violates at least one of the plurality of rules, it may be inferred that the proposed financial activity is detrimental to the financial well being of the client.

In some embodiments, the proposed financial profile may be compared to the initial financial profile to determine changes to the initial financial profile relative to the proposed financial profile.

The systems and methods may retrieve objective financial data from third party sources that may be utilized in determining the financial impact of a particular financial activity on the initial financial profile of the client.

Additionally, the present technology may mitigate or substantially reduce the labor-intensive and expensive work of upkeep and editing of client information for periodic meetings need only be carried out once, in one place. Maintenance of the data by an author is much easier and quicker than maintaining multiple versions of the information used for different purposes. It eliminates errors on different outputs, improves consistency and speed of delivery of output.

The present technology may also allow for the analysis of data and generation of grids setting forth the data analysis that relates to a financial profile (either initial or proposed). The grids may be configured to be user-friendly and convenient. Exemplary grids are provided in FIG. 9. According to various embodiments, the grids may be generated based on application of one or more rules onto data, the comparison of initial and proposed financial profiles, and so forth. Such rules may be programmed as instructions to be executed by a processor.

According to various embodiments of the present technology, the creation of the output such as a financial profile may occur in three steps: (1) Client data is entered into the system and verified for accuracy; (2) A request is made to create either a document or presentation for a given client; and (3) The system selects a blank template of either a PDF or PPT for a specific meeting, the values and text are generated from the database and then inserted into the template file. The system names the file which can then either be printed or saved onto our server for later use.

Turning to FIG. 1, FIG. 1 is a block diagram of an exemplary networking environment 100 in accordance with embodiments of the present invention. The networking environment 100 includes clients A 110, B 112, and so forth through client Z 118 (additional or fewer clients may be implemented), a network 120, a server 130 with a data analysis application 135 (also referred to herein as a "data analysis module 135") and an interface module 137, and a database 140. In some embodiments, the data analysis application 135 comprises a tool center or system. The tool center may be configured to generate and provide grids using grid components.

As with all of the figures provided herein, one skilled in the art will recognize that any number of elements 110-140 can be present in the networking environment 100 and that the exemplary methods described herein can be executed by one or more of elements 110-140. Any number of any of elements 110-140 can be present in the networking environment 100, and the networking environment 100 is configured to serve these elements. For example, the server 130 may transmit a report via the network 120 to clients 110-118, despite the fact that only three clients are shown in FIG. 1. For all figures mentioned herein, like numbered elements refer to like elements throughout.

Clients 110-118 may be implemented as computers having a processor that runs software stored in memory, wherein the software may include network browser applications (not shown) configured to render content pages, such as web pages, from the server 130. Clients 110-118 can be any computing device, including, but not limited to desktop computers, laptop computers, mobile devices, and portable digital assistants (PDAs). The clients 110-118 can communicate with a web service provided by the server 130 over the network 120. Additionally, the clients 110-118 may be configured to store an executable application that encompasses one or more functionalities provided by the data analysis application 135.

The network 120 can be any type of network, including but not limited to the Internet, LAN, WAN, a telephone network, and any other communication network that allows access to data, as well as any combination of these. The network 120 may be coupled to any of the clients 110-118, the interface module 137, and/or the server 130. As with all the figures provided herewith, the networking environment 100 is exemplary and not limited to what is shown in FIG. 1.

The server 130 can communicate with the network 120 and the database 140. It will be apparent to one skilled in the art that the embodiments of this invention are not limited to any particular type of server and/or database. For example, the server 130 may include one or more application servers, one or more web servers, or a combination of such servers. In some embodiments, the servers mentioned herein are configured to control and route information via the network 120 or any other networks (additional networks not shown in FIG. 1). The servers herein may access, retrieve, store and otherwise process data stored on any of the databases mentioned herein.

Interface Module 137 may be implemented as a machine separate from server 130 or as hardware, software, or combination of hardware and software implemented on server 130.

In some embodiments, Interface Module 137 may relay communications between the data analysis application 135 and Network 120.

Interface Module 137 may also be configured to generate user interfaces that allow end users to interact with the data analysis application 135. In some embodiments, the Interface Module 137 may generate the Tool Center ("TC") that is utilized by end users to interact with the data analysis application 135. Various pages of the Tool Center are illustrated in FIGS. 3-8. Each of the pages may include a plurality of input mechanisms for inputting the financial attributes of an individual. It will be understood that the financial attributes of an individual may be input manually by client manager or employee, or automatically via responses received from the individual pertaining to a plurality of financial prompts provided to the individual. These financial prompts may include questions regarding various aspects of the individual's financial information, such as assets, liabilities, liquidity, retirement, and the like.

According to various embodiments of the present technology, the TC may include two main areas, namely, an administration section and a client data input section. The administration section allows for the add/edit or deletion of TC users, assignment of employee roles, and other data that the system utilizes to create the output, such as Stock Bond Mix tables and returns, titles, Grid category titles, the default lists that drive the many pull down menus on the client input side of the application, and so forth.

The client data input section allows for the addition of, or editing of, a prospect or client and assignment of whether either is active or inactive. There may also be a mechanism to lock plans in case an employee wants to keep their own personal plan from view.

Once a contact (prospect or client) is created and selected, the Client Result Manager (CRM) enters the contact specific data that is shared across all plans/meetings that are created through the lifecycle of a client, such as Discovery (e.g., gathering of financial information/attributes via financial prompts), Precision Start-up or Precision Plan Update (PSU/PPU), Portfolio Enhancement Plan (PEP) and Wealth Optimization Plan (WOP).

A list of possible input categories and the meetings associated with each client may include as follows: (a) Team Member assignment to clients: Used in Discovery, PSU/PPU, PEP, WOP; (b) Net Worth: Discovery, PSU/PPU, WOP (c) Cash Flow: Discovery, PSU/PPU, WOP; (d) Portfolio Value: Discovery, PSU/PPU, WOP; (e) Big Breakthrough Data: Discovery & WOP; (f) What's Missing?: Discovery; (g) Recommended Solution Discovery; (h) Needed Documents/Permissions: PSU/PPU; (i) Portfolio Enhancement Actions: PSU/PPU, PEP; (j) PEG (Portfolio Enhancement Grid): PSU/PPU, PEP, WOP; (k) Misc. Assumptions: PSU/PPU, WOP; (l) Recommended; (m) Priorities: WOP; (n) Grids: WOP; (o) 4 "four" Scenarios: WOP.

The TC may also include Navigation Fields: WOP File Creation (PDF/PPT) and one or more Output Selection fields such as: Discovery, PSU/PPU, PEP, WOP.

The database 140 may be configured to store one or more tables of data which are accessible to the data analysis application 135. The database 140 may be configured to store folders which are accessible to the data analysis application 135.

The clients 110-118 may interface with the data analysis application 135 on server 130 via the network 120 and the interface module 137. The data analysis application 135 may receive requests and/or data from the clients 110-118. The clients 110-118 may provide data for storage in the database 140, and therefore may be in communication with the database 140. Likewise, the data analysis application 135 may access the database 140 based on one or more requests received from the clients 110-118. Further details as to the data communicated in the networking environment 100 are described more fully herein.

Figure 2:
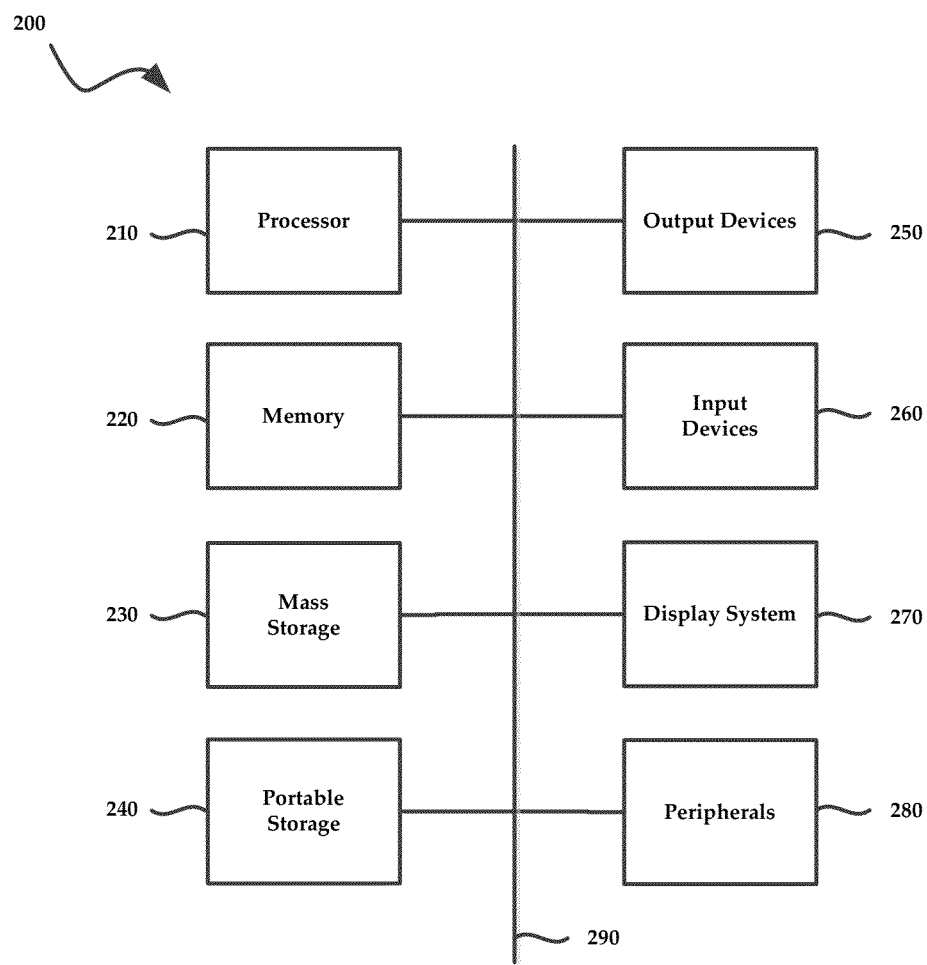
FIG. 2 is a block diagram of an exemplary computing device for analyzing and displaying information in accordance with embodiments of the present technology.

FIG. 2 is a block diagram of an exemplary computing device for analyzing and/or providing information in accordance with embodiments of the present invention. In some embodiments, the exemplary computing device of FIG. 2 can be used to implement portions of the clients 110-118 and the server 130 as shown in FIG. 1.

The computing system 200 of FIG. 2 includes one or more processors 210 and memory 220. The memory 220 stores, in part, instructions and data for execution by the processor 210. The memory 220 can store the executable code when in operation. The computing system 200 of FIG. 2 further includes a mass storage device 230, portable storage device 240, output devices 250, user input devices 260, a display system 270, and peripherals 280.

The components illustrated in FIG. 2 are depicted as being connected via a single bus 290. However, the components can be connected through one or more data transport means. For example, the processor 210 and the memory 220 can be connected via a local microprocessor bus, and the mass storage device 230, peripherals 280, the portable storage device 240, and the display system 270 can be connected via one or more input/output (I/O) buses.

The mass storage device 230, which can be implemented with a magnetic disk drive or an optical disk drive, is a non-volatile storage device for storing data and instructions for use by the processor 210. The mass storage device 230 can store the system software for implementing embodiments of the present invention for purposes of loading that software into the memory 220.

The portable storage device 240 operates in conjunction with a portable non-volatile storage medium, such as a floppy disk, compact disk or digital video disc, to input and output data and code to and from the computing system 200 of FIG. 2. The system software for implementing embodiments of the present invention can be stored on such a portable medium and input to the computing system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the computing system 200 as shown in FIG. 2 includes output devices 250. Examples of suitable output devices include speakers, printers, network interfaces, and monitors.

The display system 270 may include a CRT, a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computing system 200 of FIG. 2 are those typically found in computer systems that can be suitable for use with embodiments of the present invention and are intended to represent a broad category of such computer components that are well known in the art. Thus, the computing system 200 of FIG. 2 can be a personal computer, hand held computing device, telephone, mobile computing device, workstation, server, minicomputer, mainframe computer, or any other computing device. The computer can also include various bus configurations, networked platforms, multi-processor platforms, etc. Various operating systems can be implemented, including Unix, Linux, Windows, Macintosh OS, Palm OS, and other suitable operating systems.

Figure 3:
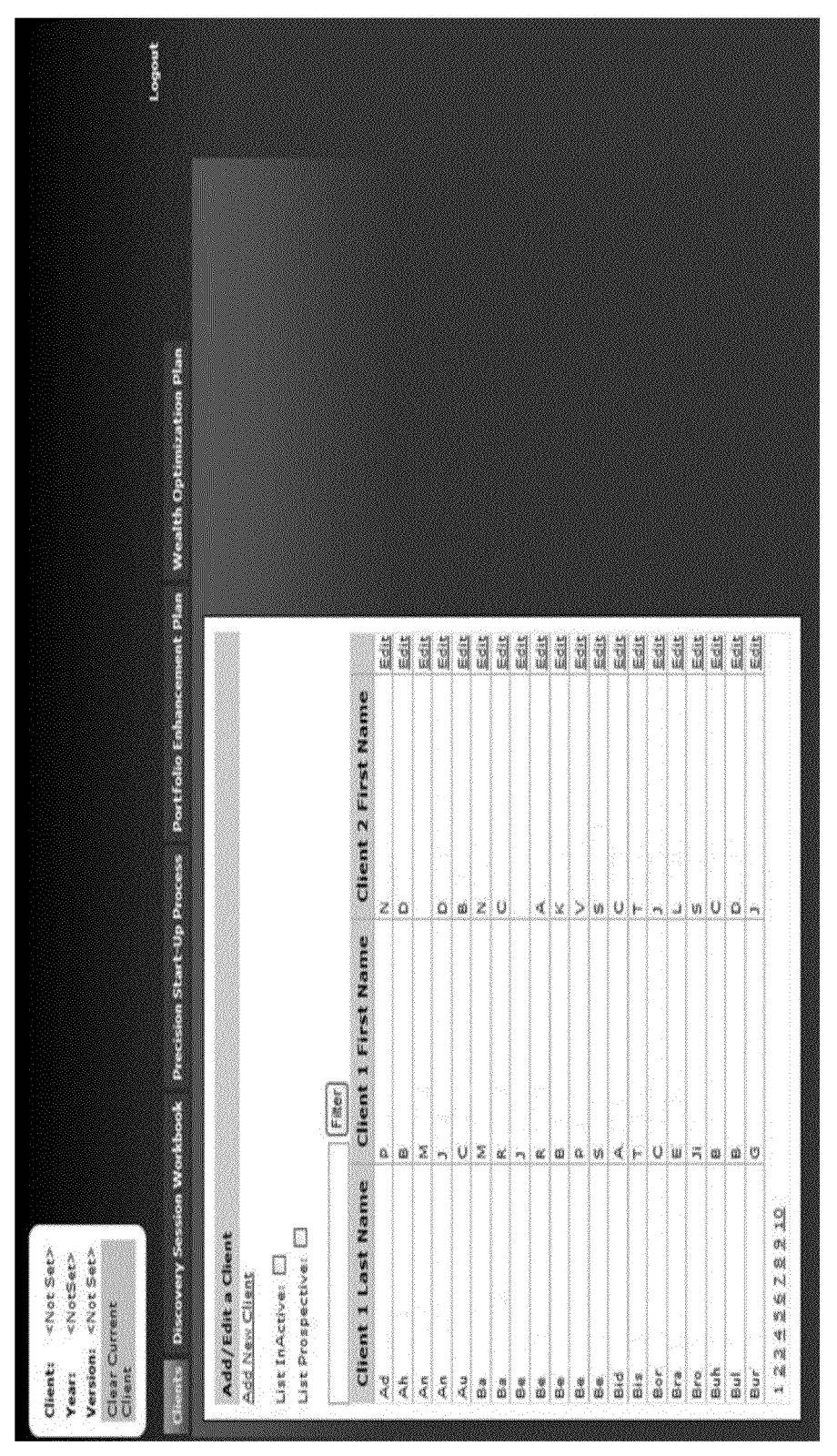
Figure 4:
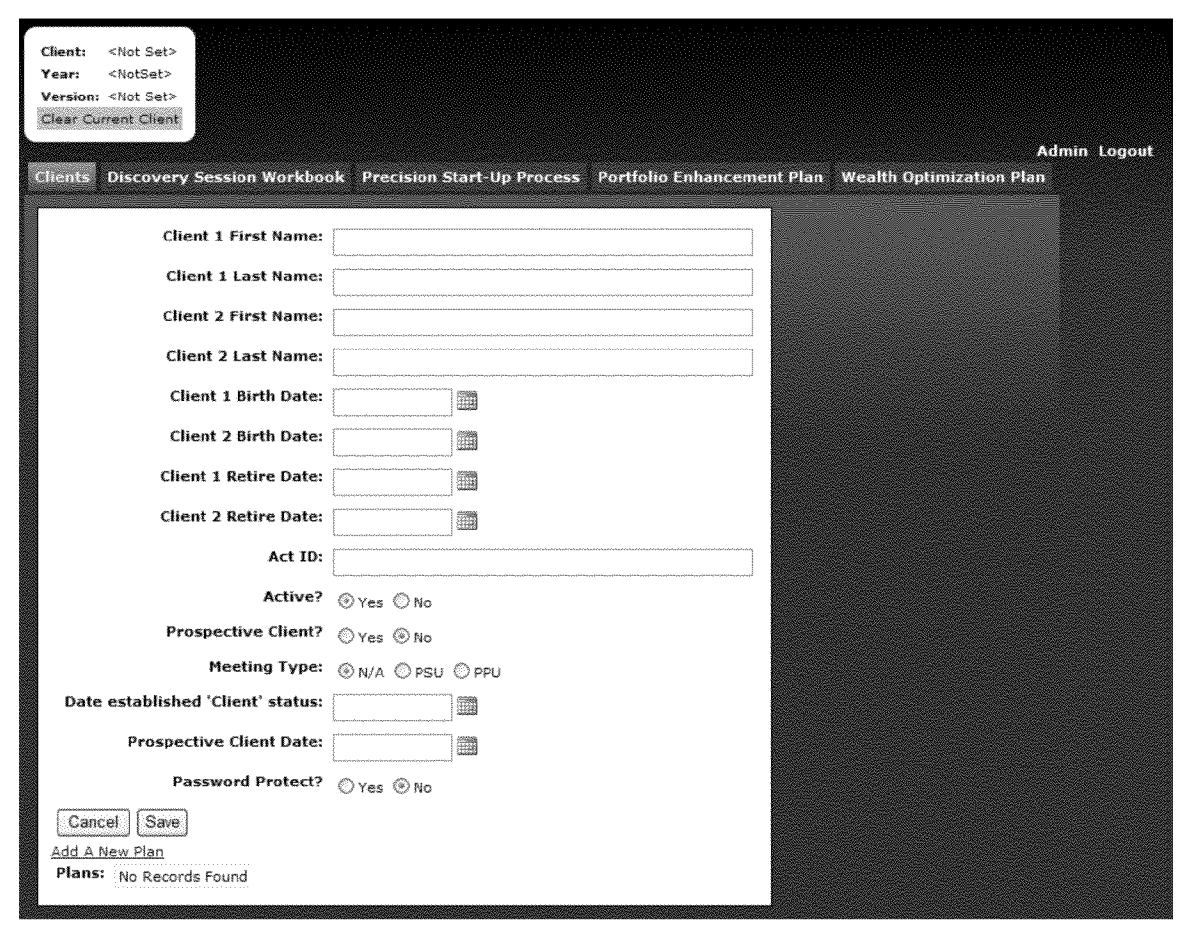

As stated previously, FIGS. 3-8 are exemplary screenshots of the TC, shown on a display of an exemplary computing device. More specifically, FIG. 3 depicts an exemplary list of clients whose data may be accessed using the present technology. FIG. 4 shows an exemplary client intake form to input data of a new client to the system using the present technology.

Figure 5:
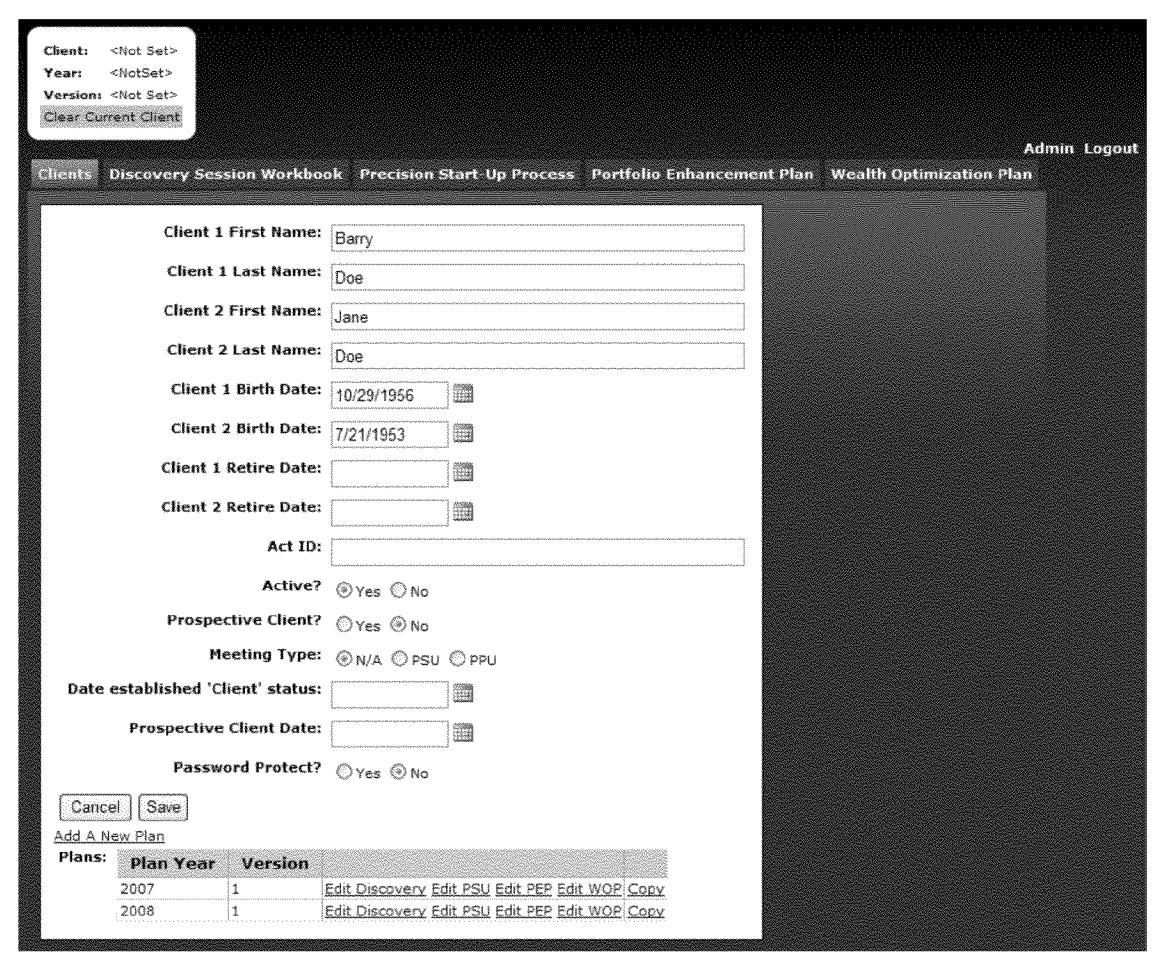
Figure 6:
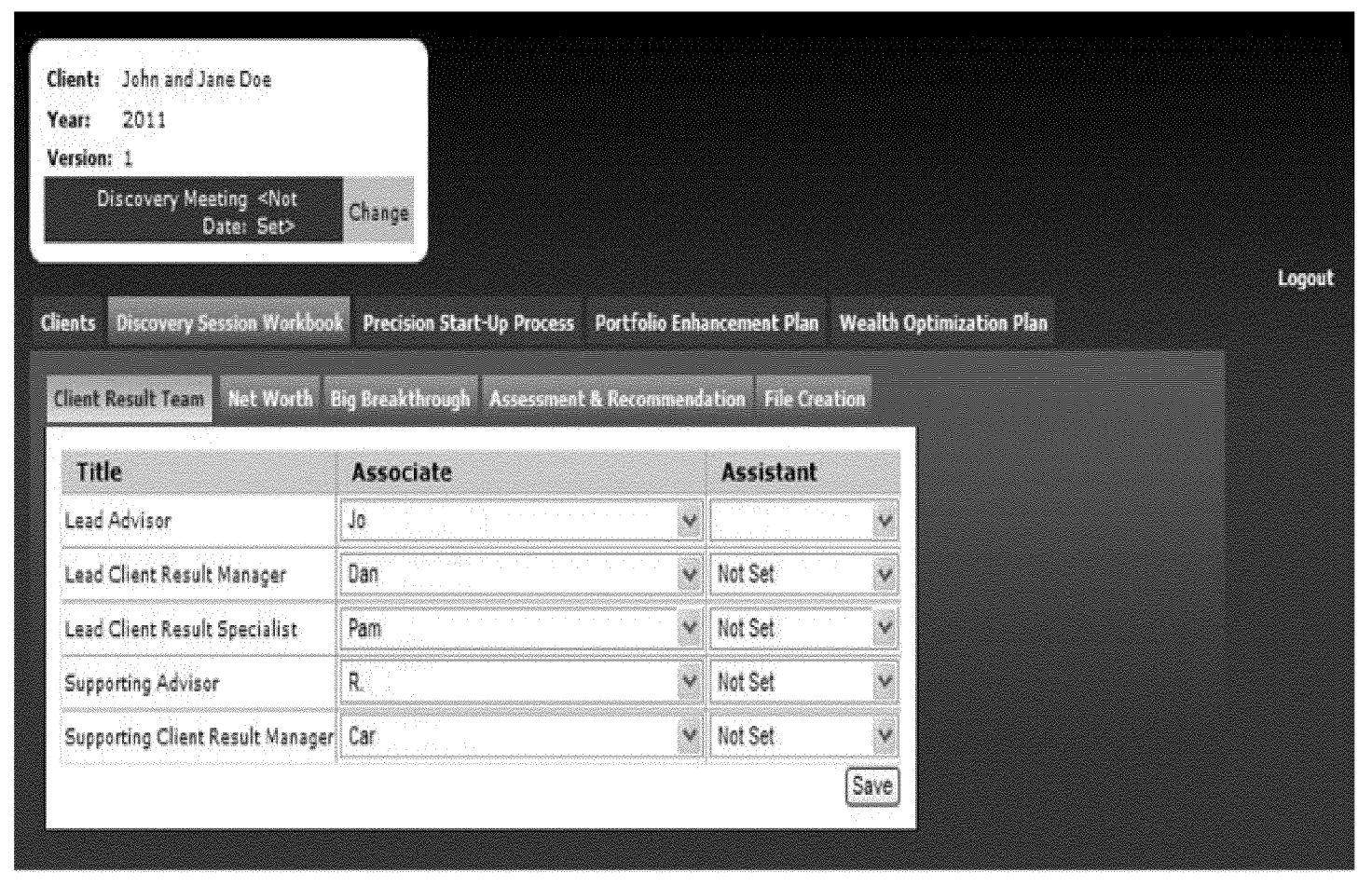
Figure 7:
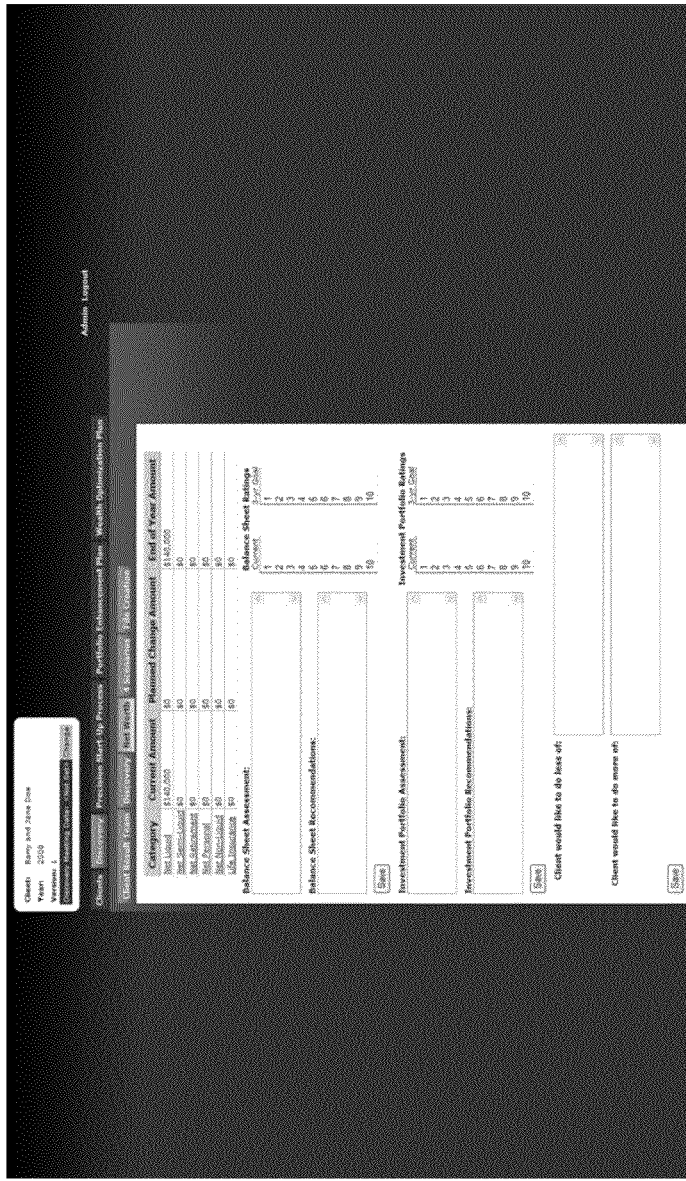
Figure 8:
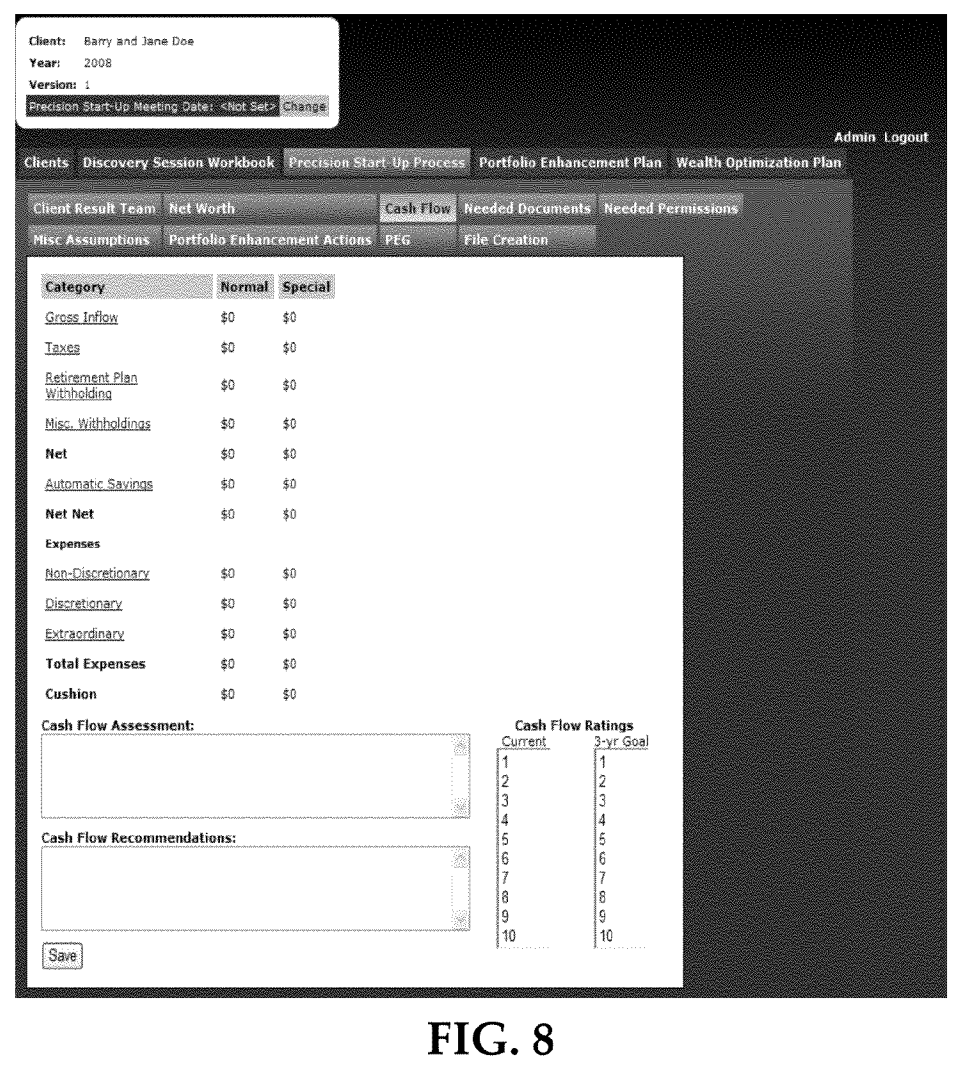

FIG. 5 depicts an exemplary client's information overview, which also provides at the bottom a listing and a link to the various versions of documents that have been generated by the system using the present technology. FIG. 6 shows an exemplary form to input the names and titles of clients who are working on a team on behalf of a particular client. FIGS. 7 and 8 show exemplary screenshots of the net work worth and cash flow tabs for a given client provided by the system using the present technology.

Figure 9:
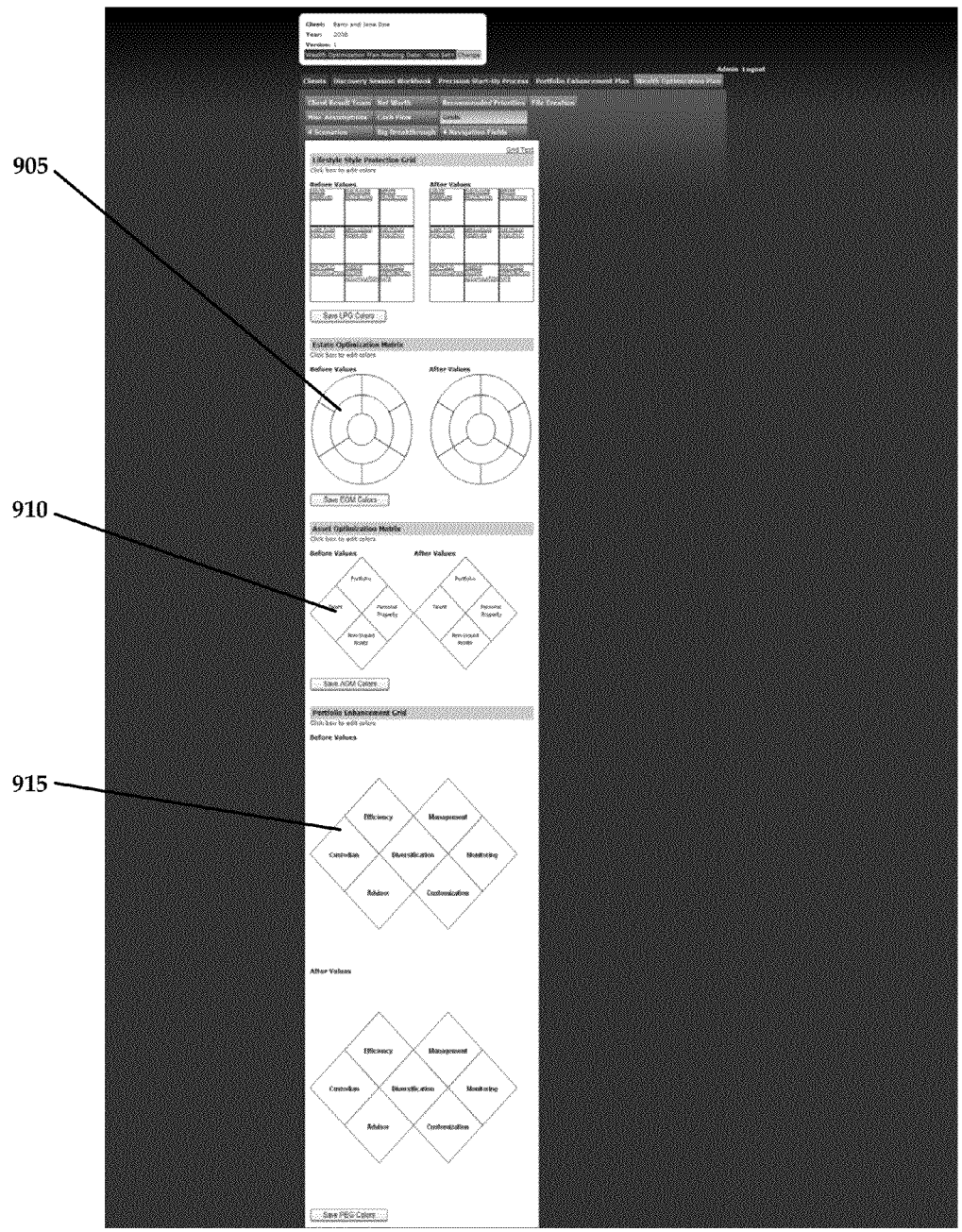
FIG. 9 illustrates a plurality of grids for displaying facets of a financial profile of a client, relative to one or more strengths.

FIG. 9 is an exemplary screenshot of grids that have been generated based on data analysis by the system using the present technology. The grids may include one or more colors, such as red, green and yellow, to depict what areas of improvement that the client should address. The colors may be inputted manually by a user or they may be determined by the processor based on programmed rules that may be applied to client data. In some embodiments, a grid may include a circular grid 905 that is divided in a plurality of radial sectors. Each of the sectors may include a different strength, as will be discussed in greater detail below. Grid 910 illustrates a diamond grid that includes four different sectors that each includes a different strength. Also, grid 915 illustrates a grid of arbitrary shape that includes a plurality of sectors.

Figure 10:
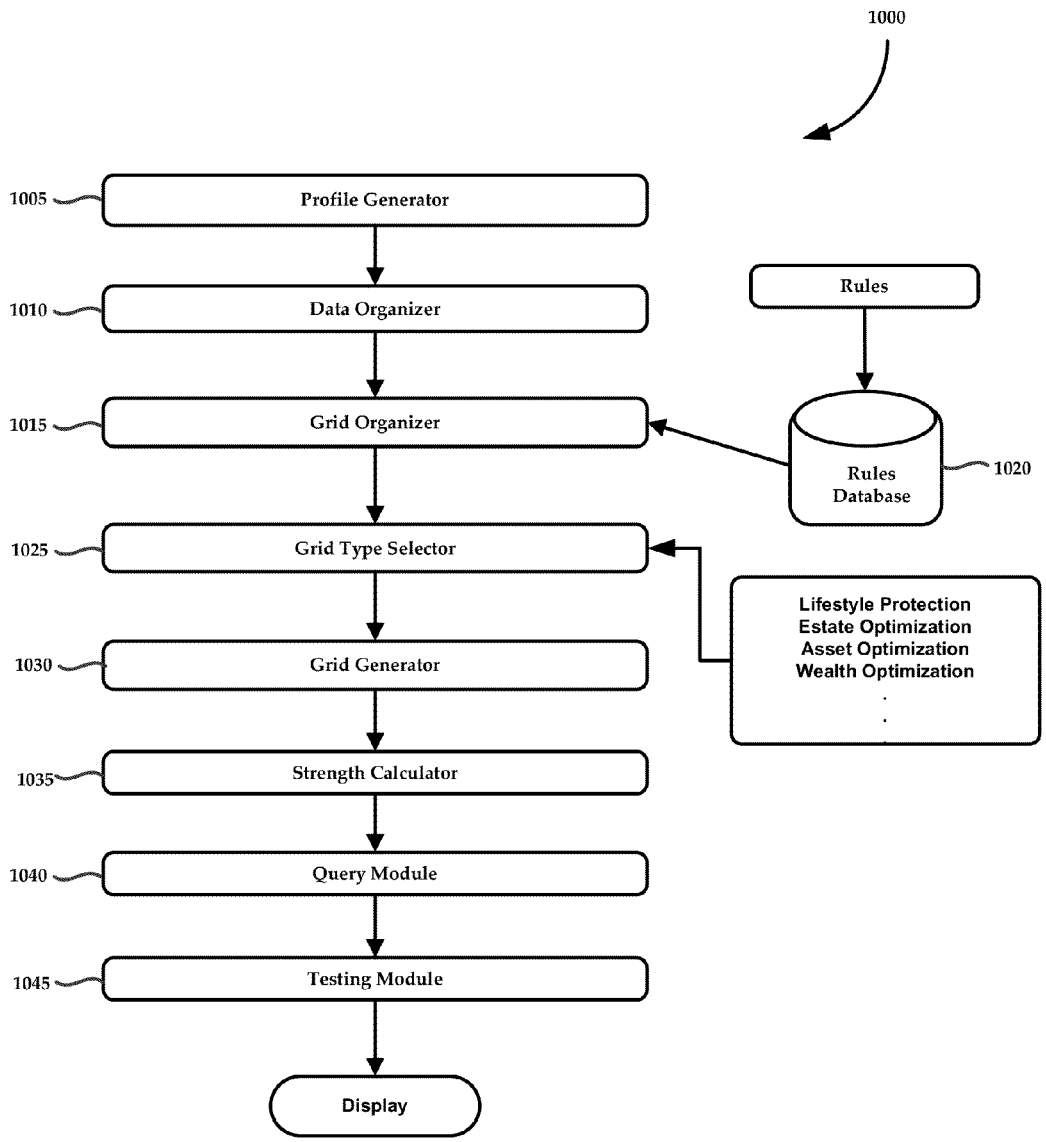
FIG. 10 is an exemplary system for optimizing wealth.

FIG. 10 is a block diagram of an exemplary system 1000 for optimizing wealth. The system 1000 may also be utilized to determine the financial well being of a client. To analyze the current financial well being of a client, the system 1000 may utilize a profile generator 1005 that is configured to receive the financial data of the client. In some embodiments, the profile generator 1005 may utilize input received via the Interface Module 137 as described in FIG. 1.

In additional embodiments, the financial information of the end user is automatically input into the profile generator 1005 based upon responses received from clients. These responses may be provided in response to providing the client with a plurality of financial prompts, such as questions that are designed to elicit financial information from the client.

After the financial information of the client has been input into the profile generator 1005, a data organizer 1010 may be utilized to aggregate the financial information of the client into a client file that may reside in a storage medium (e.g., database associated with the server 130 (FIG. 1).

A grid organizer 1015 may utilize a plurality of rules that reside within a rules database 1020 to analyze the financial information of the relative to one or more rules of the rules database 1020. The grid organizer 1015 may cooperate with a grid type selector 1025 to create one or more grids that correspond to one or more desired financial goals that are selected or chosen via the grid type selector 1025. That is, the desired goal affects the type of grid that is selected. For example, a "lifestyle protection" grid may include different facets from an "estate optimization" grid.

It will be understood that each of the different types of grids may include any number or combination of different strengths, also referred to as "essential strengths." It will further be understood that a strength is a facet of a financial profile that may be utilized to determine at least a portion of the financial well being of a client. Each of the strengths may include one or more of the rules that are stored in the rules database 1020.

Exemplary goals that may be utilized to create a financial profile of a client may include the following non-limiting examples: A "fundamental" strength goal for a particular client may be generated by comparing a combination of three different fundamental strengths, such as Balance Sheet, Cash Flow and Portfolio. With regard to Balance Sheet, rules associated with a client's balance sheet may include determining whether the client has a strong balance sheet, meaning that the vulnerabilities or weaknesses may be reduced or substantially eliminated. With regard to cash flow, rules associated therewith may include a determination as to whether the client is living within their means, whether they have adequate savings, surpluses, and the like. With regard to their Portfolio, rules associated therewith may include determining if the client has a well balanced investment portfolio. Determining whether the client has a well balanced investment portfolio may include an examination of a plurality of ancillary factors, such as investment goals, age, risk tolerance, and the like.

When considered in combination, these three strengths may define a fundamental or basic financial profile for the client.

As will be discussed below, a plurality of strengths may be considered in combination to determine even more intricate goals utilizing the financial profile of a particular client. For example, a "lifestyle protection" goal analysis may include utilizing nine different strengths such as liquidity, insurance, estate planning, semi-liquid, cash flow resiliency, portfolio resiliency, portfolio accumulation, passive income, and portfolio distribution rate. With regard to liquidity, the client's financial profile may be analyzed to determine whether they have access to an ample amount of liquid assets, bank, money market, and pre-approved credit line resources to meet expense obligations if the client's income is disrupted for several weeks or months.

With regard to insurance, the client's financial profile may be analyzed to determine if catastrophic risks can be mitigated by appropriate amounts and types of insurance coverages. With regard to estate planning, the client's financial profile may be analyzed to determine if the proper estate and supplemental documents (powers of attorney, etc.) to mitigate complications in the event of disability or untimely death. With regard to cash flow resiliency, the client's financial profile may be analyzed to determine if they can adequately limited expense obligations so that the client can substantially reduce expenses in the event of a short- or long-term economic challenge.

With regard to being semi-liquid, the client's financial profile may be analyzed to determine if they have built up adequate non-retirement investment accounts that are accessible and consist of enough conservative holdings that could be tapped for several years in the event of an extended financial crisis. With regard to being investment resiliency, the client's financial profile may be analyzed to determine if their investment portfolio is allocated in a prudent manner to provide adequate downside market protection considering the client's circumstances.

With regard to portfolio accumulation, the client's financial profile may be analyzed to determine if they have accumulated enough portfolio resources to be able to support the client's standard of living comfortably, even in less than desirable investment conditions. With regard to passive income, the client's financial profile may be analyzed to determine if they have enough passive income sources to meet a substantial portion of the client's non-discretionary expense needs, therefore reducing the withdrawal/distribution pressures from your investment portfolio. With regard to being portfolio distribution, the client's financial profile may be analyzed to determine if the client is living off or tapping into their portfolio. If so, is the distribution rate a sustainable level that easily passes stress tests of past worst-case portfolio scenarios?

One of ordinary skill in the art will appreciate that many goals which include combinations of a plurality of strengths may be utilized to provide detailed analyses of the financial profile of a client. Additionally, because each of the strengths may themselves include one or more rules, the analyses generated from the utilization of these rules may provide an objective analysis of the financial profile of the client. To be sure, in some embodiments, the system 1000 may utilize 35 different strengths to determine the financial well being of a client. Combinations of these 35 different strengths may be utilized as the basis to generate grids that each correspond to a facet of the financial well being of the client. For the purposes of brevity, additional exemplary applications of the 35 different strengths for different scenarios are provided in FIGS. 11A, 11B, and 11C.

Therefore, the system 1000 may include a grid generator 1030 that utilizes the type of grid selected by the grid type selector 1025, along with the financial information provided by the grid organizer 1015 to generate one or more grids that are each indicative of a facet of the financial well being of a client. Exemplary grid templates are illustrated in FIG. 9.

A grid may include at least one, and in some embodiments, a plurality of sectors, such that each of the sectors is associated with a unique strength. Rather than simply inputting the financial information of the client into the appropriate sector, the system 1000 may utilize a strength calculator 1035 that determines if the financial information of the client that corresponds to a particular strength is acceptable. In other words, the system 1000 may provide a calculation of a wealth index for the client dynamically. The strength calculator 1035 may include a threshold that is utilized as a benchmark for determining if the financial information of a client is acceptable or not. For example, for a strength such as "liquidity," the strength calculator 1035 may utilize a threshold amount, such as a percentage of the combined assets of the client that are currently liquid. The system 1000 provides alerts in "what if" scenarios, such that the client can be made aware whether a "what if" scenario is financially advantageous or not for the client.

If this percentage meets or exceeds the threshold amount, the strength calculator 1035 may cause the grid generator 1030 to assign an indicator such as a particular color (e.g., green) to the sector of the grid associated with liquidity. It will be understood that in this particular example, the meeting or exceeding of a threshold amount for "liquidity" was considered to be indicative of a positive financial strength for that client. In other examples, meeting or exceeding the threshold amount may be indicative of a negative financial strength for that client, for example, a total amount of retirement funds falling below a threshold amount. The strength calculator 1035 may assign an indicator to indicate a negative financial strength, such as red.

In some embodiments, the color for a particular sector may be selected based upon whether the strength level of the strength associated with the sector meets or exceeds a strength threshold.

FIG. 10 also illustrates an exemplary query module 1040 for evaluating a financial impact of a proposed financial activity. The query module 1040 may be utilized for optimizing wealth by entering financial information and, via speaking input, to provide financial queries related to wealth optimization.

The client may provide the query module 1040 with proposed financial queries that may be analyzed in light of the initial financial profile, to determine the financial impact of the proposed financial query in light of the client's financial profile.

In some embodiments a financial query may corresponds to a proposed financial activity. For example, "should I purchase a home that costs $500,000?" The query module 1040 may analyze a financial query to determine financial attributes associated with the financial query.

To determine the financial impact of the proposed financial activities on the financial profile of a client, the financial attributes of the financial query may be incorporated into the financial profile to create an updated financial profile.

The query module 1040 may utilize the data analysis module 135 (described in greater detail with regard to FIG. 1) to compare the financial profile to a plurality of rules to determine if the updated financial profile negatively affects the financial well being of the client. If the updated financial profile does, in fact, negatively affect the financial well being of the client, an alert message may be provided to a computing system, such as a computing system associated with a financial advisor of the client or a computing system associated with the client, and may also suggest or recommend the change of one or more parameters of the financial profile to further optimize the client's financial well being, as depicted in the grids utilized in this system 1000. The phrase "financial well being" may be understood to include an objective analysis of the financial profile of the client relative to a plurality of strengths, and in some instances, relative to the 35 essential strengths.

It will be understood that the plurality of rules may be associated with one or more financial strengths, as described in greater detail above.

To evaluate the financial impact of a proposed financial activity, the data analysis module 135 may be adapted to retrieve financial data from a plurality of third party financial data sources, such as banks, a stock exchange, other financial institutions, and so forth.

For example, if the financial query includes "Should I purchase a home that costs $500,000?", the data analysis module 135 may first determine the credit score of the client by contacting a third party credit bureau. After determining the credit score of the client, the data analysis module 135 may contact various banking institutions to obtain quotations for a loan based upon the credit score of the client, along with other factors such as a potential down payment. The potential optimized down payment may be determined by evaluating the amount of cash the client has in savings at their banking institution.

Next, the data analysis module 135 may determine whether the monthly cost of the mortgage payment for the proposed home purchase meets or exceeds an acceptable percentage of the take home pay of the client. For example, a rule regarding the maximum acceptable percentage of take home pay may include 40%. Therefore, any proposed monthly mortgage payment that exceeds 40% of the client's take home pay may negatively affect the financial well being of the client. For example, the client may not be able to meet other necessary financial obligations.

Therefore, if the proposed financial activity negatively affects the financial well being of the client, the data analysis module 135 may generate an alert that may be provided to the client via their computing device that the proposed financial activity negatively affects the financial well being of the client, and is therefore discouraged. In addition, as a dynamic tool, the system 1000 may propose a re-balancing of the wealth parameters such that the client may be able to engage in an activity that the client wishes to do. For instance, if the client wishes to purchase a house, the system 1000 may propose a re-balancing of the client's wealth parameters for optimization, such that the client may be able to pay a monthly payment which would otherwise be too high. According to various embodiments, the grids of the system 1000 can be used to rebalance such parameters dynamically.

It is noteworthy to mention that answers to financial queries are provided "on the fly," in that the system 1000 is configured to process the financial query, evaluate the financial query in light of the financial profile of the client, locate financial data from third party financial data resources (if necessary), and provide the computing system of the client with an answer to the financial query. As stated above, the answer may include an alert message indicating that the proposed financial activity negatively affects the financial well being of the client. In other embodiments, the answer may include additional types of information such as an alternative plan. For example, the system 1000 may determine that the client can only afford a $250,000 home. In such a case, the system 1000 may provide an answer that includes an alternative plan for purchasing a $250,000 home. For example, the alternative plan may include steps for obtaining a loan, a current interest rate (based upon their credit score), a listing of homes in their area that are within their price range, and so forth. Thus, the system 1000 may propose a re-balancing of parameters that would allow a client to engage in an activity (such as a purchasing event) that the client would otherwise financially not be able to afford but for the system's re-balancing of parameters.

Alternatively, or in addition to providing an alert, the data analysis module 135 may provide an updated grid that may illustrate the potential negative financial impact of the proposed financial activity on the initial financial profile of the client.

Additionally, the data analysis module 135 may be adapted to provide a side-by-side comparison of the initial financial profile of the client to an updated financial profile of the client. The updated financial profile may be generated by incorporating one or more financial attributes of the proposed financial activity into the initial financial profile of the client. In some embodiments, the side-by-side comparison may include two grids placed side-by-side, a first grid including the initial financial profile and the second including the updated financial profile. Colors may be utilized to highlight the areas impacted by the proposed financial activity. For example, a green section in the first grid that is shown as red in the second grid may indicate the negative financial impact of a proposed financial activity.

In additional examples, a client may ask the system 1000 the following question: "I have $10,000 in cash. Where should I put this money to enhance my balance sheet or portfolio?" Thus, the system 1000 can inform the client where they should put their money. The system 1000 helps the client to make decisions based on an overview of the client's overall holistic financial life by allowing for scenario testing of the client's financial portfolio. The system may look at the rules, the ratings (balance sheet, portfolio), priority rules, and outside financial information (interest rates, investment market valuations, etc., all pre-programmed in the system for optimal wealth management) and propose one or more actions along with the benefits of each action. If the client had $5,000 in high interest credit card debt and had low liquid reserves, the system may propose to the client to 1) pay-off visa card with $5,000 and 2) add $5,000 to the client's money market reserve. If, on the other hand, there are no credit card issues and the client had full liquidity, etc., the technology may see a weakness in the portfolio accumulation and seek out the balance of the present portfolio and information in the system on current investment preferences and propose a solution, such as adding $10,000 to the client's semi-liquid portfolio and selecting a quality no-load emerging market mutual fund.

In response to the questions received, the system may provide alternative actions and the impact on the grids and ratings of the 35 essential strengths. The technology may also obtain updates of data (from manual inputs or, more likely, electronic links from accounts, etc.) and show how ratings are impacted in the 35 essential strength areas. Finally, the system 1000 may propose a prioritized action plan based upon the rules, priorities and various data points programmed into the system (such as current economic cycle being in mild recession, slow growth, strong growth, etc.). The system 1000 can import outside data or information from external resources outside the system, the client's data, and/or the client questionnaire (such as via the Internet), to obtain information regarding trends, current economic cycles, prices of stock, forecasts, and further financial information, data or news that is external to the system 1000 itself.

According to some embodiments, the system 1000 may also include a testing module 1045 that may "back test" the financial profile of the client. For example, utilizing the financial information of the client, the testing module 1045 may utilize third party financial information gathered from a multiplicity of sources to "back test" the current financial profile of the client. This type of "back test" allows the client to determine the relative strength of their financial profile over a period of time in the past. For example, the testing module 1045 may utilize third party financial data to back test the financial profile of the client back in time, as far as the financial data will allow. In some embodiments, to "pass" a back test, the financial profile of the client may produce only a four percent or less probability of depletion over a period of 40 years. In other words, the system 1000 allows for the optimization of future actions to include automated back testing by the system itself.

If the testing module 1045 determines one or more negatively performing facets of the financial profile over the given period of time based upon the historical data, the system 1000 may provide the negatively performing facets of the financial profile for display to the display device of the client. The negatively performing facets may be displayed as a list, grid, matrix, or any other visual or audible format that is perceivable to an end user.

In additional embodiments, the testing module 1045 may be configured to execute stress testing of the financial profile of the client. Stress testing may include testing module 1045 placing additional stress factors into the back test to determine if the financial profile of the client would pass with these additional stress factors. It will be understood that the inclusion of stress factors may attempt to mimic unforeseeable financial disasters associated with cyclical events such as recessions. Stated otherwise, the additional stress factors of the stress test may correspond to a potentially negative financial scenario. There may be an optimization of parameters by the system 1000 through reallocation, based on back testing and stress testing. Alerts may be generated by the system 1000 to warn the client of deteriorating financial resources or deteriorating financial well being of the client.

According to some embodiments, the testing module 1045 may be further configured to generate a graph of the performance of the financial profile over the given period of time based upon the historical data.

Embodiments of the present invention may be practiced on any device that is configured to receive and/or provide data such as, but not limited to, servers, clients, computing devices, computers, laptops, cellular phones, and computing systems.

It should be noted that any hardware platform suitable for performing the processing described herein is suitable for use with the system. The terms "computer-readable media" and "storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise an embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, a RAM, a PROM, an EPROM, an EEPROM, a FLASHEPROM, any other memory chip or cartridge, a carrier wave, or any other medium from which a computer can read.

The above-described modules may be comprised of instructions that are stored on storage media. The instructions can be retrieved and executed by the processor 210. Some examples of instructions include software, program code, and firmware. Some examples of storage media comprise memory devices and integrated circuits. The instructions are operational when executed by the processor 210 to direct the processor 210 to operate in accordance with embodiments of the present invention. Those skilled in the art are familiar with instructions, processor(s), and storage media.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The present technology is described above with reference to exemplary embodiments. It will be apparent to those skilled in the art that various modifications may be made and other embodiments can be used without departing from the broader scope of the present technology. Therefore, these and other variations upon the exemplary embodiments are intended to be covered by the present technology.

What is claimed is:

1. A method for analyzing financial well being of a client, comprising:
generating a financial profile for a client via a web server by:
receiving responses to a plurality of financial prompts to establish financial information of the client; and
comparing the financial information of the client to a plurality of strengths to generate the financial profile based upon the plurality of strengths, each of the plurality of strengths including one or more rules;
selecting one or more grids for displaying at least a portion of the financial profile, the one or more grids including at least one sector, the at least one sector corresponding to one of the plurality of strengths;
providing the at least one sector with an indicator, the indicator including a calculation of a strength level for the strength associated with the sector; and
providing at least one of the one or more grids to a display device associated with a computing system that is communicatively coupled to the web server.

2. The method according to claim 1, further comprising back testing the financial profile of the client by:
obtaining historical financial data from a third party for a given period of time;
comparing the financial profile of the client to the historical financial data;
determining negatively performing facets of the financial profile over the given period of time based upon the historical financial data; and
providing the negatively performing facets of the financial profile to the display device that is associated with the computing system that is communicatively coupled to the web server.

3. The method according to claim 2, further comprising placing additional stress factors into the step of back testing to determine negatively performing facets of the financial profile, the additional stress factors corresponding to a potentially negative financial scenario.

4. The method according claim 1, wherein selecting one or more grids is based upon selecting of at least one financial goal, the at least one financial goal comprising a combination of a plurality of strengths.

5. A method for evaluating a financial impact of a proposed financial activity, comprising:
generating an initial financial profile for an individual by:
receiving responses to a plurality of financial prompts;
establishing personal financial information of the individual; and
comparing the financial information of the individual to a plurality of strengths to generate the initial financial profile based upon the plurality of strengths, each of the plurality of strengths including one or more rules;
receiving a financial query via a web server, the financial query including one or more financial attributes of a proposed financial activity,
incorporating at least one of the one or more financial attributes of the proposed financial activity into the initial financial profile to create an updated financial profile;
comparing the updated financial profile to the plurality of strengths to determine if incorporating at least one of the one or more financial attributes of the proposed financial activity negatively impacts a financial well being of the individual; and
providing an alert to a computing system that is communicatively coupled to the web server if incorporating at least one of the one or more financial attributes of the proposed financial activity violates at least one of a plurality of rules.

6. The method according to claim 5, further comprising:
selecting one or more grids for displaying at least a portion of the financial profile, one or more grids each including at least one sector, the at least one sector corresponding to one of the plurality of strengths;

providing the at least one sector with an indicator, the indicator including a calculation of a strength level for the strength associated with the at least one sector; and
providing at least one of the one or more grids to a display device associated with a computing system that is communicatively coupled to the web server.

7. The method according claim 6, wherein selecting one or more grids is based upon selecting of at least one financial goal, the at least one financial goal comprising a combination of a plurality of strengths.

8. The method according to claim 6, wherein the indicator includes a color, the color being selected based upon whether the strength level of the strength associated with at least one sector meets or exceeds a strength threshold.

9. The method according to claim 6, further comprising back testing the financial profile of the individual by:
   obtaining historical financial data from a third party for a given period of time;
   comparing the financial profile of the individual to the historical financial data;
   determining negatively performing facets of the financial profile over the given period of time based upon the historical financial data; and
   providing the negatively performing facets of the financial profile to the display device that is associated with the computing system that is communicatively coupled to the web server.

10. The method according to claim 9, further comprising placing additional stress factors into the step of back testing to determine negatively performing facets of the financial profile, the additional stress factors corresponding to a potentially negative financial scenario.

11. A system for evaluating a financial impact of a proposed financial activity on a financial well being of a client, comprising:
   a memory storing executable instructions for evaluating the financial impact of a proposed financial activity;
   a processor for executing the instructions, the instructions including:
   a profile generator that is configured to generate an initial financial profile for a client by:
      receiving responses to a plurality of financial prompts to establish financial information of the client; and
      comparing the financial information of the client to a plurality of strengths to generate the initial financial profile based upon the plurality of strengths, each of the plurality of strengths including one or more rules;
   a query module that is configured to receive a financial query, the financial query including one or more financial attributes of a proposed financial activity; and
   a data analysis module that is configured to:
      incorporate at least one of the one or more financial attributes of the proposed financial activity into the initial financial profile to create an updated financial profile;
      comparing the updated financial profile to the plurality of strengths to determine if incorporating at least one of the one or more financial attributes of the proposed financial activity negatively impacts the financial well being of the client; and
      providing an alert to a computing system if incorporating at least one of the one or more financial attributes of the proposed financial activity negatively impacts the financial well being of the client.

12. The system according to claim 11, further comprising a grid generator that is configured to:
   select one or more grids for displaying at least a portion of the financial profile, the grid including at least one sector, the at least one sector corresponding to one of the plurality of strengths;
   fill the at least one sector with an indicator, the indicator including a calculation of a strength level for the strength associated with the at least one sector; and
   provide at least one of the one or more grids to a display device associated with a computing system that is communicatively coupled to the web server.

13. The system according to claim 12, wherein the indicator includes a color, the color being selected based upon whether the strength level of the strength associated with the at least one sector meets or exceeds a strength threshold.

14. The system according to claim 13, wherein the system further comprises a testing module that is configured to back test the financial profile of the client by:
   obtaining historical financial data from a third party for a given period of time;
   comparing the financial profile of the client to the historical financial data;
   determining a performance of the financial profile over the given period of time based upon the historical financial data; and
   locating negatively performing facets of the financial profile based upon the determining.

15. The system according to claim 14, wherein the testing module is further configured to generate a graph of the performance of the financial profile over the given period of time based upon the historical financial data.

16. The system according to claim 15, wherein the testing module is further configured to provide negatively performing facets of the financial profile to the display device of the computing system.

17. The system according to claim 14, wherein the testing module is further configured to place additional stress factors into the step of back testing to determine negatively performing facets of the financial profile, the additional stress factors corresponding to a potentially negative financial scenario.

18. The system according to claim 11, wherein the one or more rules associated with each of the plurality of strengths are stored in a storage medium associated with the system.

19. The system according to claim 11, wherein the data analysis module is further configured to compare the updated financial profile to financial data received from a plurality of third party financial data sources.

20. A method for analyzing financial well being of a client, comprising:
   receiving, via a tool center generated by a server, a financial query from the client, the financial query comprising a request to analyze a financial profile of the client relative to at least one goal, the financial profile of the client being determined by responses to a plurality of financial prompts;
   comparing, via the server, the financial information of the client to a plurality of strengths, each of the plurality of strengths including one or more rules for determining a strength level of a facet of a financial profile of the client, the plurality of strengths being selected based upon the at least one goal included in the financial query;
   generating a grid that includes sectors, each of the sectors corresponding to one of the plurality of strengths and each of the sectors including an indicator that corresponds to the strength level of one of the plurality of strengths; and
   providing, via the tool center of the server, the grid to the client.

21. A method for analyzing financial well being of a client, comprising:
- receiving, via a tool center generated by a server, responses to a plurality of financial prompts to establish financial information of the client;
- comparing, via the server, the financial information of the client to a plurality of strengths to generate a financial profile, each of the plurality of strengths including one or more rules for determining a strength level of a facet of the financial profile of the client;
- storing, via the server, the financial profile of the client in a client record that resides in a content repository;
- receiving, via the server, a financial query from the client, the financial query comprising a proposed financial activity;
- determining, via the server, an impact of the proposed financial activity on the financial profile of the client;
- generating one or more proposed actions for the client, wherein each of the one or more proposed actions comprises at least one action to be taken relative to the proposed financial activity that increases a strength level of at least one facet of the financial profile of the client; and
- providing, via the server, at least one of the proposed actions to the client.

22. The method according to claim 21, wherein generating one or more proposed actions for the client comprises comparing at least a portion of the financial profile of the client to third-party financial information.

23. The method according to claim 21, further comprising:
- generating a grid that includes sectors, each of the sectors corresponding to one of the plurality of strengths and each of the sectors including an indicator that corresponds to the strength level of one of the plurality of strengths; and
- displaying the grid via the tool center.

24. The method according to claim 21, further comprising generating a grid for each of the proposed actions; each of the grids illustrating an impact of the at least one action to be taken relative to the proposed financial activity that increases a strength level of at least one facet of the financial profile of the client.

25. The method according to claim 21, wherein the grid comprises a fundamental goal that comprises a balance sheet sector, a cash flow sector, and a portfolio sector.

26. The method according to claim 21, wherein the grid comprises a lifestyle goal that comprises a liquidity sector, an insurance sector, an estate planning sector, a semi-liquid sector, a cash flow resiliency sector, a portfolio resiliency sector, a portfolio accumulation sector, a passive income sector, and a portfolio distribution rate sector.

27. The method according to claim 21, further comprising providing an alert message via the tool center if the proposed financial activity negatively impacts a strength level of a facet of the financial profile of the client.

* * * * *